US005560981A

United States Patent [19]
Ito

[11] Patent Number: 5,560,981
[45] Date of Patent: Oct. 1, 1996

[54] DOUBLE MOLDED PRODUCT

[75] Inventor: Katsuya Ito, Yokkaichi, Japan

[73] Assignee: Sumitomo Wiring Systems, Ltd., Mie, Japan

[21] Appl. No.: 431,824

[22] Filed: May 1, 1995

Related U.S. Application Data

[63] Continuation of Ser. No. 220,152, Mar. 30, 1994, abandoned.

[30] Foreign Application Priority Data

Apr. 7, 1993 [JP] Japan .................................. 5-106201

[51] Int. Cl.[6] .................................................. B32B 9/00

[52] U.S. Cl. .......................... 428/209; 428/409; 439/696; 439/652; 439/701; 439/367; 439/736; 439/752

[58] Field of Search .................................. 439/522, 395, 439/701, 496, 367, 596, 409, 696, 736, 752, 668, 652; 174/87, 92; 428/209, 457, 409

[56] References Cited

U.S. PATENT DOCUMENTS

| | | | |
|---|---|---|---|
| 3,550,066 | 9/1968 | Cootes | 439/696 |
| 4,453,353 | 1/1984 | Killop | 174/136 |
| 4,473,715 | 9/1984 | Beinhaur | 174/87 |
| 4,516,822 | 5/1985 | Wolfel | 439/668 |
| 4,517,408 | 5/1985 | Pegram | 174/156 |
| 4,555,589 | 11/1985 | Osada | 174/156 |
| 4,669,421 | 6/1987 | Flintjer | 119/18 |
| 4,698,459 | 10/1987 | Drake | 439/522 |
| 4,758,185 | 7/1988 | Reuss | 439/701 |
| 4,897,052 | 1/1990 | Priest | 439/652 |
| 4,954,940 | 9/1990 | Chandler | 439/409 |
| 4,963,700 | 10/1990 | Olsen | 174/92 |
| 4,979,913 | 12/1990 | Aiello | 439/596 |
| 5,027,538 | 7/1991 | Wilmes | 24/545 |
| 5,083,939 | 1/1992 | Ittah | 439/496 |
| 5,279,030 | 1/1994 | Ito | 439/752 |
| 5,295,857 | 5/1994 | Toly | 439/395 |
| 5,368,500 | 11/1994 | Dedering | 439/367 |

FOREIGN PATENT DOCUMENTS 4-369515 12/1992 Japan .

*Primary Examiner*—Patrick Ryan
*Assistant Examiner*—Patrick Jewik
*Attorney, Agent, or Firm*—Oliff & Berridge

[57] ABSTRACT

A double molded product is produced by secondary molding a primary molded product with a resin, the primary molded product comprising a connector portion accommodating at least one wire and an inside-outside communication portion communicating the inside of a mold with the outside during a secondary molding. The inside-outside communication portion comprises at east one notch for respectively holding the wires extending from inside of the mold to the outside.

6 Claims, 5 Drawing Sheets

DOUBLE MOLDED PRODUCT

This is a continuation of application Ser. No. 08/220,152 filed Mar. 30, 1994, now abandoned.

BACKGROUND OF THE INVENTION

This invention relates to a double molded product, and more particularly to a double molded product in which wires are mounted on a primary molded product, and then a resin is molded on this primary molded product.

A conventional double molded product of this type is disclosed in Japanese Patent Unexamined Publication No. 4369515. What is disclosed is a double molded connector.

As shown in FIGS. 6 and 7, a connector portion 1*a* for holding wires 3 which has a fitting terminal 2 clamped to a front end thereof is formed at an upper portion of a primary molded product 1. An inside-outside communication portion 1*b* for communicating the inside of a mold with the outside of the mold during a double molding operation is formed at a lower portion of the primary molded product. The inside-outside communication portion 1*b* has through holes 1*b*1 for the passage of the wires 3 therethrough, respectively.

For producing the connector of such a construction, the fitting terminal 2 is compressively clamped to one end of the wire 3, and this end portion is held by the connector portion 1*a*, and the other end of the wire 3 is passed through the through hole 1*b*1 in the inside-outside communication portion 1*b*. Then, the connector portion 1*a* is placed in molds, with the inside-outside communication portion 1*b* held between the molds. After a resin molding, a double molded product 4 is completed as shown in FIGS. 8 and 9.

Thus, the primary molded product is held between the molds, with each wire 3 passed through the through hole 1*b*1 in the inside-outside communication portion 1*b*1. By doing so, the molds will not be contacted directly with the wires, and the wires will not be clamped between the molds, and a covering of the wire will not be fused.

In the above conventional double molded product, it is necessary to pass one end of the wire through the through hole in the inside-outside communication portion, and this through hole has a diameter substantially equal to that of the wire to prevent leakage during a double molding operation. Therefore, there has been encountered a problem that much time and troublesome work are required for passing the wire.

The present invention has been made in view of the above problem, and an object of the invention is to provide a double molded product which can reduce time and troublesome work required in process.

SUMMARY OF THE INVENTION

In order to achieve the above object, the invention provides a double molded product which is produced by secondary molding a primary molded product with a resin, the primary molded product comprising, a connector portion accommodating at least one wire, and an inside-outside communication portion communicating the inside of a mold with outside during a secondary molding. The inside-outside communication portion comprises, at least one notch for respectively holding the wires extending from inside of the mold to the out side.

Furthermore, a double molded product according to the present invention, wherein the notch includes a wire retaining portion for retaining the wire at an inner end portion of the notch.

Still further, a double molded product according to the present invention, wherein a lid potion for closing the notch, with the wire held respectively in the notch.

In the construction of a double molded product according to the invention, the notches are formed in the wire holder portion, and by pushing the wire into the notch from its open end, the wire can be held in the notch. Thereafter, the inside-outside communication portion is held between the molds, and a double molding operation is carried out.

Furthermore, in the construction of the invention, when the wire is pushed into the notch from its open end, the wire retaining portion retains the wire in the notch, and prevents the wire from being disengaged from the notch during a subsequent operation.

Still further, in the construction of the invention, the wire is held in the notch, and then the notch is closed by the wire holder lid. By doing so, the wire is prevented from being disengaged from the notch during a subsequent operation, and an excessive space communicating the inside and outside of the mold with each other is reduced.

As described above, in the present invention, the wire is pushed into and held in the notch, and therefore there is provided the double molded product which can be produced more easily as compared with the conventional construction in which the wire is passed through the through hole.

Furthermore, the wire is positively held and retained in the notch, and therefore the wire will not be disengaged from the notch during a subsequent operation, thus obviating the need for again pushing the wire into the notch.

Still further, the disengagement of the wire is prevented, and the resin is less liable to leak through an excessive space which communicate the inside and outside of the mold with each other during a resin molding operation.

DETAILED DESCRIPTION OF THE PREFERRED EMBODIMENTS

A preferred embodiment of the present invention will now be described with reference to the drawings.

Figure 1:
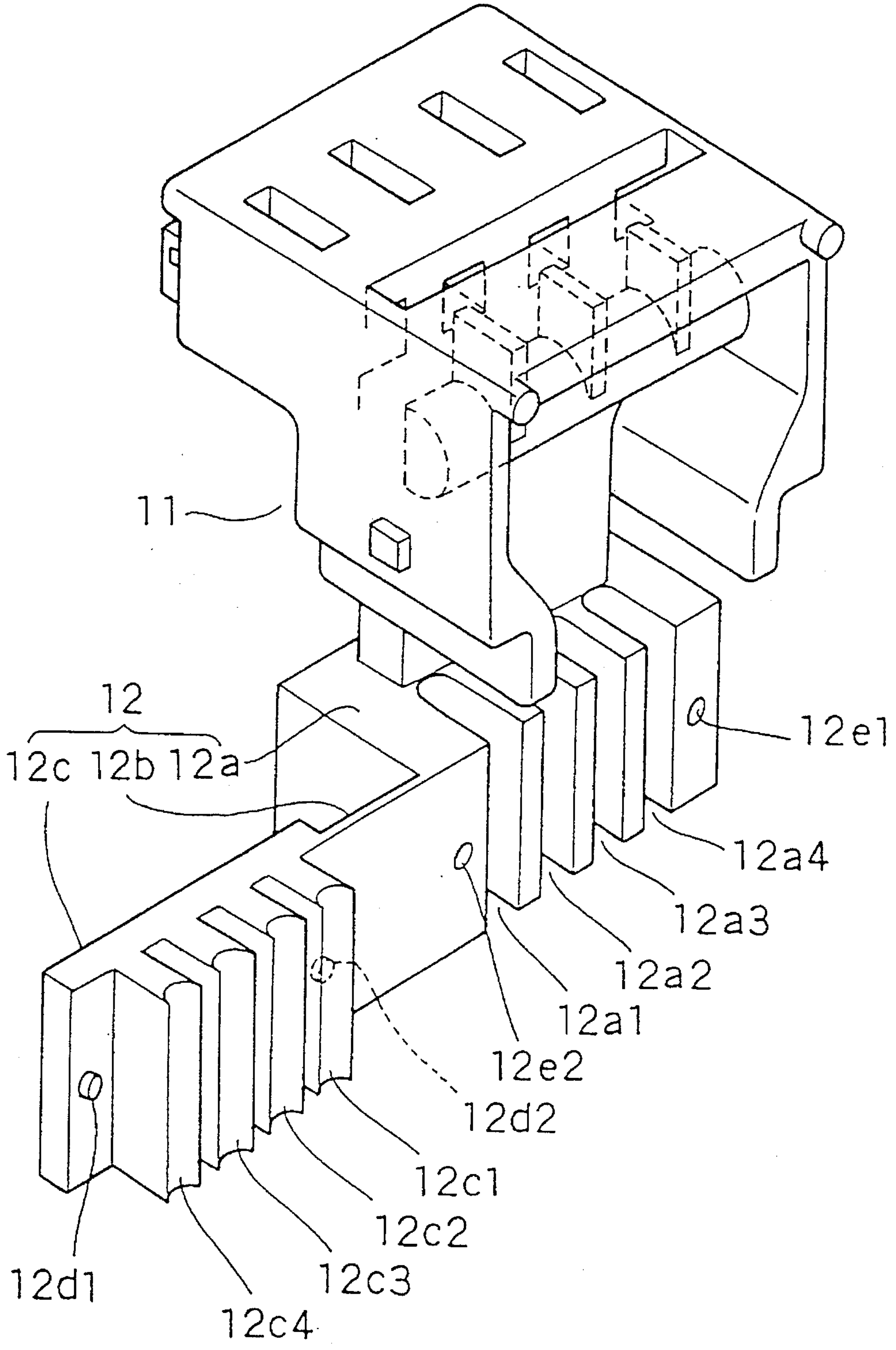
FIG. 1 is a perspective view of a core of a double molded product in the form of a connector provided in accordance with the present invention.

FIG. 1 is a perspective view of a primary molded product (hereinafter referred to as "core") of a double molded product in the form of a connector according to the present invention.

In this Figure, a connector portion 11 is formed at an upper portion of the core 10, and an inside-outside communication portion 12 for communicating the inside of a mold with the outside of the mold during a double molding operation is formed at a lower portion of the core. The inside-outside communication portion 12 includes a body portion 12*a* in the form of a generally rectangular block, and a lid portion 12*c* connected through a thin sheet hinge portion 12*b* shaped a thin sheet to the body portion 12*a* for being able to turn into facing relation to one side face of the body portion 12*a*. Four notches 12*a*1~12*a*4 are formed in that side face of the body portion to which the lid portion 12*c* can be turned into facing relation, and extend from an upper face to a lower face of the body portion. An inner end of each of the notches 12*a*1~12*a*4 has a semi-circular shape, and the diameter of this semi-circular portion is equal to that of a wire W.

Holder pieces 12*c*1~12*c*4 corresponding respectively to the notches 12*a*1~12*a*4 are formed on and projected from that side of the lid portion 12*c* which can be turned into facing relation to the body portion 12*a*, the holder pieces 12*c*1~12*c*4 being receivable in the notches 12*a*1~12*a*4, respectively. The width of the holder pieces 12*c*1~12*c*4 is equal to the width of the notches 12*a*1~12*a*4, and the distal end of each holding piece is recessed into a semi-circular shape corresponding to the semi-circular shape of the inner end of each notch 12*a*1~12*a*4. With this arrangement, when the distal end of each holding piece and the inner end of the corresponding notch are disposed in facing relation to each other, they jointly form a cylindrical hole.

Projections 12*d*1 and 12*d*2 are formed respectively on opposite end portions of that side of the lid portion 12*c* having the holder pieces 12*c*1~12*c*4 formed thereon. Engagement holes 12*e*1 and 12*e*2 are formed respectively on opposite end portions of that face of the body portion 12*a* having the notches 12*a*1~12*a*4 formed therein, and are arranged respectively at positions corresponding to the projections 12*d*1 and 12*d*2, respectively. The wire W, as well as a fitting terminal T compressively clamped to a front end of the wire W, is the same as a conventional one.

The operation for producing the connector which is described above will now be described.

Figure 2:
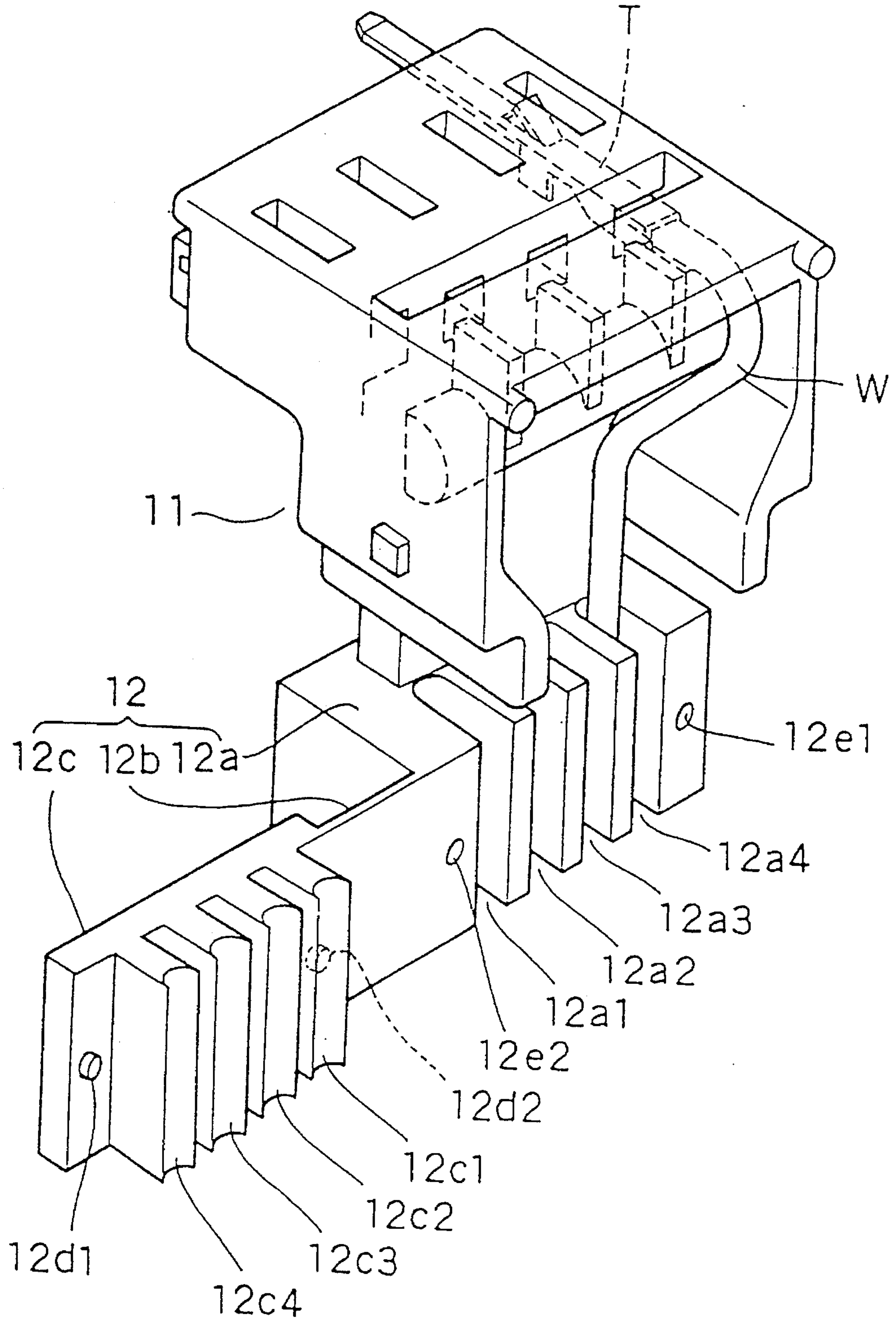
FIG. 2 is a perspective view of the core having a wire mounted thereon.
Figure 3:
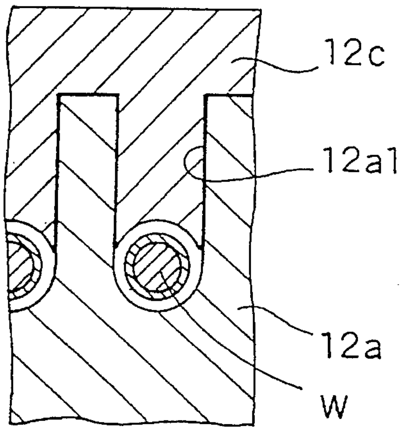
FIG. 3 is a cross-sectional view of an inside-outside communication portion.

First, the fitting terminal T is compressively clamped to one end of the wire W, and is held by the connector portion 1*a*, as in the conventional construction. After the end portion of the wire with the fitting terminal T clamped thereto is thus held, each wire W is bent to be directed to an open end of a respective one of the four notches 12*a*1~12*a*4. Each wire W is pushed into this notch in a direction perpendicular to the axis of the wire W. After the wire is thus pushed into the notch, the hinge portion 12*b* is bent to turn the lid portion 12*c* so that the holder pieces 12*c*1~12*c*4 can be inserted into the notches 12*a*1~12*a*4, respectively. This condition is shown in FIGS. 2 and 3.

As the holder pieces 12*c*1~12*c*4 are inserted, they press the respective wires W at their distal ends deeper toward the inner ends of the notches 12*a*1~12*a*4, respectively. When the projections 12*d*1 and 12*d*2 on the lid portion 12*c* are fitted respectively into the engagement holes 12*e*1 and 12*e*2 in the body portion 12*a*, the semi-circular surface of the inner end of each of the notches 12*a*1~12*a*4 and the semi-circular surface of the distal end of a respective one of the holder pieces 12*c*1~12*c*4 surround the periphery of the wire W.

Figure 8:
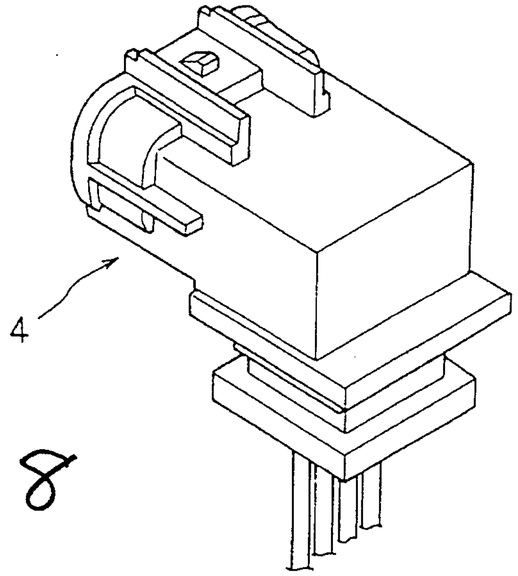
FIG. 8 is a perspective view showing a double molded condition.
Figure 9:
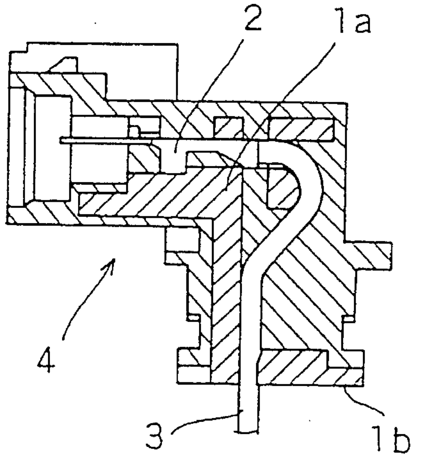
FIG. 9 is a cross-sectional view showing the double molded condition.

Thereafter, the connector portion 11 is placed in the mold for double molding purposes in such a manner that the inside-outside communication portion 12 communicates the inside of the mold with the outside of the mold, and a resin is filled in the mold, thus completing a double molding operation. At this time, because cylindrical holes, which are formed by facing the notches and the holder pieces, are sealed with the wires W, the resin is not leaked through the inside-outside communication portion 12. When the mold is removed after the resin is solidified, there is provided the connector similar to that shown in FIG. 8.

Thus, the notches 12*a*1~12*a*4 are formed in the inside-outside communication portion 12 adapted to extend from the inside of the mold to the outside of the mold, and merely by pushing the wires W into these notches 12*a*1~12*a*4, respectively, the wires W can be mounted in a manner to extend from the inside of the mold to the outside of the mold, without being contacted with the mold. The open ends of the notches 12*a*1~12*a*4 are closed by the lid portion 12*c*, and therefore the wire W once pushed into the notch 12*a*1~12*a*4 will not be disengaged therefrom.

Figure 4:
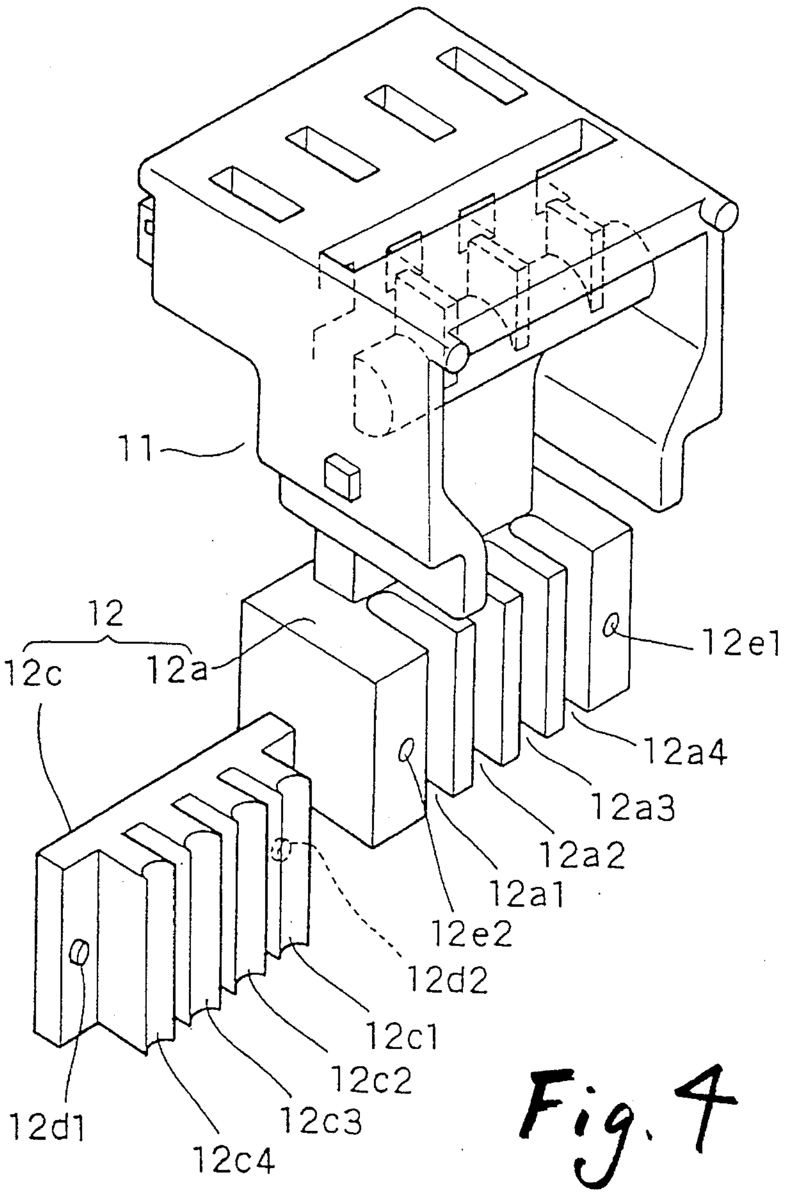
FIG. 4 is a perspective view of another embodiment of a core.

In the above embodiment, although the lid portion 12*c* is integrally connected to the body portion 12*a* through the hinge portion 12*b*, they may be separate from each other, as shown in FIG. 4.

Figure 5:
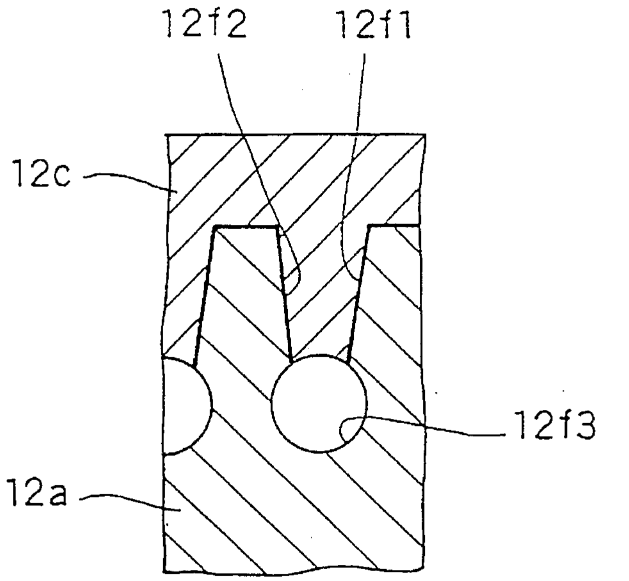
FIG. 5 is a cross-sectional view of an inside-outside communication portion of another embodiment.
Figure 6:
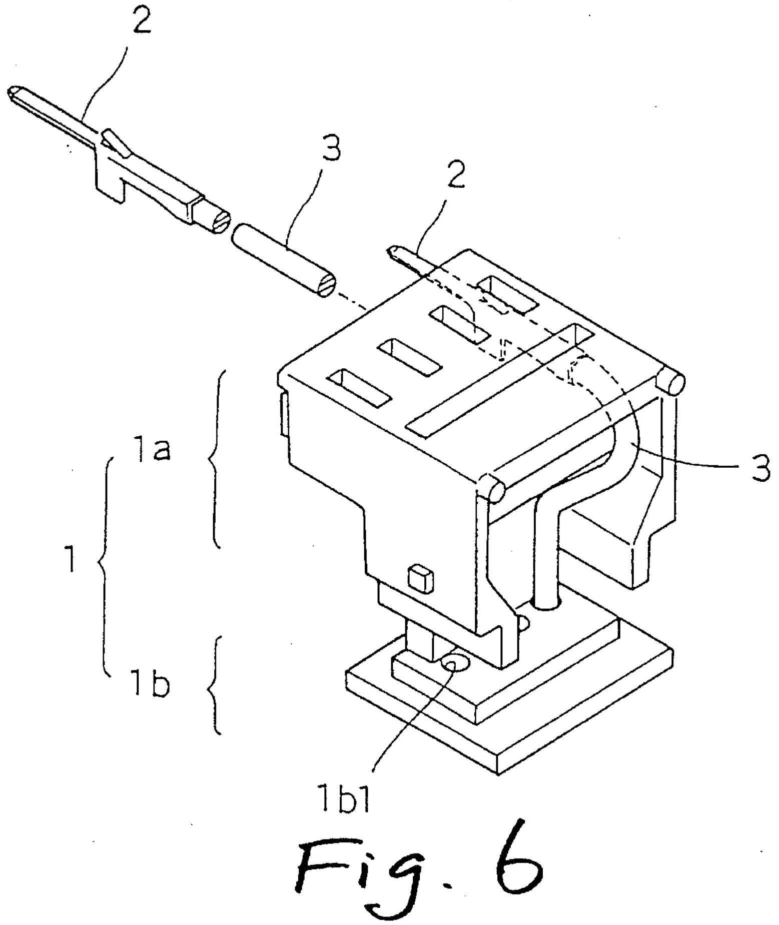
FIG. 6 is a perspective view of a conventional core having a wire mounted thereon.
Figure 7:
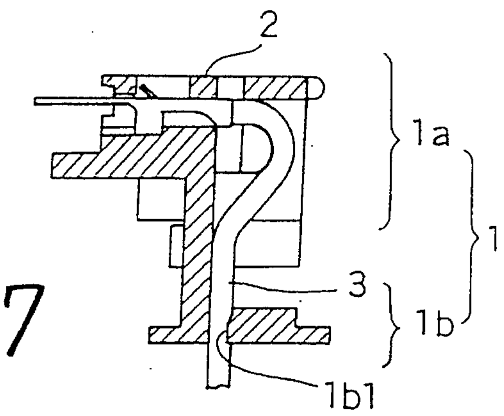
FIG. 7 is a cross-sectional view of the conventional core having the wire mounted thereon.

Although the notches 12*a*1~12*a*4 have a U-shaped cross-section having generally parallel opposed side surfaces as shown in FIG. 3, they may be of such a configuration that opposed side surfaces 12*f*1 and 12*f*2 get closer to each other progressively toward the inner end to gradually reduce the width, and that a wire holder groove 12*f*3 of a generally circular shape is formed at the inner end, as shown in FIG. 5. In this case, the distance between the side surfaces 12*f*1 and 12*f*2 at an open portion of the wire holder groove 12*f*3 is smaller than the diameter of the wire W, and therefore the wire W forced into the wire holder groove 12*f*3 is prevented from being disengaged therefrom. Namely, those portions from the inner end of the side surfaces 12*f*1 and 12*f*2 to the wire holder groove 12*f*3 serve as a wire retaining portion for retaining the wire at the inner end of the notch. Therefore, even without the lid portion 12*c*, the wire W would not be disengaged. Even if the lid portion 12*c* is not provided, the wire can be held in the notch in such a manner that the wire extends from the inside of the mold to the outside of the mold.

What is claimed is:

1. A double molded connector produced by secondary molding a primary molded product, the double molded connector comprising a primary molded product having a connector portion and an inside-outside communication portion, wherein:

said connector portion is shaped to receive at least one wire;

said inside-outside communication portion comprises a corresponding at least one notch shaped to receive said at least one wire;

said inside-outside communication portion is disposed adjacent said connector portion and shaped to communicate a connector portion inside with an outside of the double molded connector after secondary molding;

said inside-outside communication portion includes a lid portion having at least one holder piece insertable in said at least one notch wherein said lid portion is attached to said inside-outside communication portion by a hinge; and said at least one notch comprises linearly converging walls, reducing a width of said at least one notch in a wire inserting direction until said at least one notch terminates in a semicircular wire holder groove.

2. A double molded connector produced by secondary molding a primary molded product, the double molded connector comprising a primary molded product having a connector portion and an inside-outside communication portion, wherein:

said connector portion has at least one entrance opening, at least one exit opening and a channel between said openings shaped to receive at least one wire;

said inside-outside communication portion has at least one elongated notch, said at least one elongated notch being disposed substantially perpendicularly to said at least one channel and shaped to receive the at least one wire extending through said at least one exit opening of said connector portion;

said inside-outside communication portion further comprises a lid connected with said inside-outside communication portion by a flexible hinge, said lid including at least one portion shaped to close said at least one elongated notch thereby surrounding the at least one wire; and said at least one elongated notch comprises linearly converging walls reducing a width of said at least one elongated notch in a wire inserting direction until said at least one notch terminates in a semicircular wire holder groove.

3. A double molded connector according to claim 2, wherein said hinge comprises a flexible member fixed to said lid portion and said inside-outside communication portion.

4. A double molded connector according to claim 2, wherein said lid portion further comprises at least one holder piece insertable into said at least one notch.

5. A double molded connector according to claim 2, wherein said lid portion further comprises at least one projection insertable into a corresponding at least one hole within said inside-outside communication portion.

6. A double molded connector according to claim 4, wherein said inside-outside communication portion comprises a plurality of notches accommodating multiple wires.

* * * * *